(12) United States Patent
Brockington et al.

(10) Patent No.: US 10,778,638 B2
(45) Date of Patent: Sep. 15, 2020

(54) SEARCHING CONTACT DATA BASED ON PRODUCT DATA

(71) Applicant: SAP SE, Walldorf (DE)

(72) Inventors: David Brockington, Soquel, CA (US); Damien Murphy, Daly City, CA (US); Vivek Ranjan, Sunnyvale, CA (US); Oliver Conze, Heidelberg (DE)

(73) Assignee: SAP SE, Walldorf (DE)

( * ) Notice: Subject to any disclaimer, the term of this patent is extended or adjusted under 35 U.S.C. 154(b) by 330 days.

(21) Appl. No.: 15/464,249

(22) Filed: Mar. 20, 2017

(65) Prior Publication Data

US 2017/0272401 A1   Sep. 21, 2017

Related U.S. Application Data

(60) Provisional application No. 62/311,102, filed on Mar. 21, 2016.

(51) Int. Cl.
*H04L 29/12* (2006.01)
*G06Q 10/10* (2012.01)
*G06F 16/248* (2019.01)
*G06F 16/2457* (2019.01)

(52) U.S. Cl.
CPC ........ *H04L 61/1594* (2013.01); *G06F 16/248* (2019.01); *G06F 16/24578* (2019.01); *G06Q 10/105* (2013.01)

(58) Field of Classification Search
CPC .................................................. H04L 61/1594
USPC ............................................................ 709/217
See application file for complete search history.

(56) References Cited

U.S. PATENT DOCUMENTS

| | | | |
|---|---|---|---|
| 2003/0078821 A1* | 4/2003 | Gorur | G06Q 10/06 705/7.42 |
| 2011/0093502 A1* | 4/2011 | Batra | G06F 16/907 707/780 |

\* cited by examiner

*Primary Examiner* — Sm A Rahman
*Assistant Examiner* — Emad Siddiqi
(74) *Attorney, Agent, or Firm* — Foutainhead Law Group P.C.

(57) ABSTRACT

Some embodiments provide a non-transitory machine-readable medium that stores a program. The program receives from a client device a request for contacts to use to initiate communications for a product. The program further identifies a set of contacts associated with a user of the client device. The program also determines a subset of the set of contacts associated with the user based on data associated with the product. The program further provides the client device the subset of the set of contacts associated with the user as candidates for initiating communications for the product.

19 Claims, 8 Drawing Sheets

| Matches for Product A | | |
|---|---|---|
| (JS) | John Smith<br>✓ President<br>✓ Acme, Inc. | 255 — Initiate — 205 |
| (LH) | Laura Hammond<br>✓ Vice President<br>✓ ABC Company | 255 — Initiate — 210 |
| (PH) | Paul Hofman<br>✗ Board Member<br>✓ State University | 255 — Initiate — 215 |
| (DR) | David Rockford<br>✗ Director<br>✓ XYZ Technologies, Inc. | 255 — Initiate — 220 |
| (JS) | Jeffrey Strauss<br>✗ Manager<br>✓ XYZ Technologies, Inc. | 255 — Initiate — 225 |
| (ML) | Mary Lee<br>✗ Human Resources<br>✓ XYZ Technologies, Inc. | 255 — Initiate — 230 |
| (SA) | Susan Adams<br>✗ Accounting<br>✓ 123, Inc. | 255 — Initiate — 235 |
| (ML) | Michael Lim<br>✓ President<br>✗ USA Bank | 255 — Initiate — 240 |
| (MA) | Megan Arnold<br>✓ Chief Financial Officer<br>✗ Storage Solutions, Inc. | 255 — Initiate — 245 |
| (BK) | Brian Klein<br>✓ Vice President<br>✗ Storage Solutions, Inc. | 255 — Initiate — 250 |

| Products | | Matches | |
|---|---|---|---|
| 305 | A — Product A<br>7 Prospects<br>$63,000 referral potential | (JS) John Smith<br>✓ President<br>✓ Acme, Inc. | 255 — Initiate — 205 |
| 310 | B — Product B<br>5 Prospects<br>$55,000 referral potential | (LH) Laura Hammond<br>✓ Vice President<br>✓ ABC Company | 255 — Initiate — 210 |
| 315 | C — Product C<br>15 Prospects<br>$52,500 referral potential | (PH) Paul Hofman<br>✗ Board Member<br>✓ State University | 255 — Initiate — 215 |
| 320 | D — Product D<br>11 Prospects<br>$44,000 referral potential | (DR) David Rockford<br>✗ Director<br>✓ XYZ Technologies, Inc. | 255 — Initiate — 220 |
| 325 | E — Product E<br>7 Prospects<br>$35,000 referral potential | (JS) Jeffrey Strauss<br>✗ Manager<br>✓ XYZ Technologies, Inc. | 255 — Initiate — 225 |
| 330 | F — Product F<br>13 Prospects<br>$31,200 referral potential | (ML) Mary Lee<br>✗ Human Resources<br>✓ XYZ Technologies, Inc. | 255 — Initiate — 230 |
| 335 | G — Product G<br>4 Prospects<br>$22,000 referral potential | (SA) Susan Adams<br>✗ Accounting<br>✓ 123, Inc. | 255 — Initiate — 235 |
| 340 | H — Product H<br>3 Prospects<br>$18,000 referral potential | (ML) Michael Lim<br>✓ President<br>✗ USA Bank | 255 — Initiate — 240 |
| | | (MA) Megan Arnold<br>✓ Chief Financial Officer<br>✗ Storage Solutions, Inc. | 255 — Initiate — 245 |
| | | (BK) Brian Klein<br>✓ Vice President<br>✗ Storage Solutions, Inc. | 255 — Initiate — 250 |

United States Patent No. US 10,778,638 B2

SEARCHING CONTACT DATA BASED ON PRODUCT DATA

CROSS-REFERENCE TO RELATED APPLICATION

The present application claims the benefit and priority of U.S. Provisional Application No. 62/311,102, filed Mar. 21, 2016, entitled "Sales Business Network," the entire contents of which are incorporated herein by reference in its entirety for all purposes.

BACKGROUND

Today, contact information is typically stored and managed by computing devices (e.g., desktop computers, smartphones, tablets, etc.) and/or applications running on such devices. The information of a contact may include a name, addresses, telephone numbers, emails, social media profiles, a birthday, employment information (e.g., a company name, a title/position, etc.), a photo, a website uniform resource locator (URL), etc. Many of the computing devices and/or applications include a function for performing searches on the contact information. For example, a user may use such a function to search through the user's contacts based on a first name and/or last name in order to find a contact having the first name and/or last name.

SUMMARY

In some embodiments, a non-transitory machine-readable medium stores a program. The program receives from a client device a request for contacts to use to initiate communications for a product. The program further identifies a set of contacts associated with a user of the client device. The program also determines a subset of the set of contacts associated with the user based on data associated with the product. The program further provides the client device the subset of the set of contacts associated with the user as candidates for initiating communications for the product.

In some embodiments, the data associated with the product includes a ranked list of job titles and a ranked list of industry identifiers. The program may further sort the subset of the set of contacts associated with the user based on the ranked list of job titles and the ranked list of industry identifiers. Each contact in the set of contacts associated with the user may include a company name. Determining the subset of the set of contacts associated with the user may include identifying a set of unique company names based on the company names of the set of contacts. Each contact in the set of contacts associated with the user may further include a job title. The data associated with the product may include a ranked list of job titles. The subset of the set of contacts associated with the user may include at least one of a first set of contacts, a second set of contacts, and a third set of contacts. The first set of contacts may include contacts that have a job title specified in the ranked list of job titles and that have a company name that is included in the set of unique company names. The second set of contacts may include contacts that have a company name that is included in the set of unique company names but do not have a job title specified in the ranked list of job titles. The third set of contacts may include contacts that have a job title specified in the ranked list of job titles but do not have a company name that is included in the set of unique company names.

In some embodiments, the product may be a first product, the request may be further for contacts to use to initiate communications for a second product, and the subset of the set of contacts associated with the user may be a first subset. The program may further determine a second subset of the set of contacts associated with the user based on data associated with the second product. The program may also provide the client device the second subset of the set of contacts associated with the user as candidates for initiating communications for the second product.

In some embodiments, the client device may be a first client device, the request may be a first request for contacts to use to initiate communications for a first product, and the set of contact may be a first set of contacts. The program may further receive from a second client device a second request for contacts to use to initiate communications for a second product. The program may also identify a second set of contacts associated with a second user of the second client device. The program may further determine a subset of the second set of contacts associated with the second user based on data associated with the second product. The program may also provide the second client device the subset of the second set of contacts associated with the second user as candidates for initiating communications for the second product. The subset of the set of contacts associated with the user may be provided to the client device through a graphical user interface (GUI).

In some embodiments, a method receives from a client device a request for contacts to use to initiate communications for a product. The method further identifies a set of contacts associated with a user of the client device. The method also determines a subset of the set of contacts associated with the user based on data associated with the product. The method further provides the client device the subset of the set of contacts associated with the user as candidates for initiating communications for the product.

In some embodiments, the data associated with the product may include a ranked list of job titles and a ranked list of industry identifiers. The method may further sort the subset of the set of contacts associated with the user based on the ranked list of job titles and the ranked list of industry identifiers. Each contact in the set of contacts associated with the user may include a company name. Determining the subset of the set of contacts associated with the user may include identifying a set of unique company names based on the company names of the set of contacts. Each contact in the set of contacts associated with the user may further include a job title. The data associated with the product may include a ranked list of job titles. The subset of the set of contacts associated with the user may include at least one of a first set of contacts, a second set of contacts, and a third set of contacts. The first set of contacts may include contacts that have a job title specified in the ranked list of job titles and that have a company name that is included in the set of unique company names. The second set of contacts may include contacts that have a company name that is included in the set of unique company names but do not have a job title specified in the ranked list of job titles. The third set of contacts may include contacts that have a job title specified in the ranked list of job titles but do not have a company name that is included in the set of unique company names.

The product may be a first product, the request may be further for contacts to use to initiate communications for a second product, and the subset of the set of contacts associated with the user may be a first subset. The method may further determine a second subset of the set of contacts associated with the user based on data associated with the second product. The method may also provide the client device the second subset of the set of contacts associated with the user as candidates for initiating communications for the second product.

The client device may be a first client device, the request may be a first request for contacts to use to initiate communications for a first product, and the set of contact may be a first set of contacts. The method may further receive from a second client device a second request for contacts to use to initiate communications for a second product. The method may also identify a second set of contacts associated with a second user of the second client device. The method may further determine a subset of the second set of contacts associated with the second user based on data associated with the second product. The method may also provide the second client device the subset of the second set of contacts associated with the second user as candidates for initiating communications for the second product. The subset of the set of contacts associated with the user may be provided to the client device through a graphical user interface (GUI).

In some embodiments, a system includes a set of processing units and a non-transitory computer-readable medium that stores instructions. The instructions cause at least one processing unit to receive from a client device a request for contacts to use to initiate communications for a product. The instructions further cause the at least one processing unit to identify a set of contacts associated with a user of the client device. The instructions also cause the at least one processing unit to determine a subset of the set of contacts associated with the user based on data associated with the product. The instructions further cause the at least one processing unit to provide the client device the subset of the set of contacts associated with the user as candidates for initiating communications for the product.

In some embodiments, the data associated with the product may include a ranked list of job titles and a ranked list of industry identifiers. The instructions may further cause the at least one processing unit to sort the subset of the set of contacts associated with the user based on the ranked list of job titles and the ranked list of industry identifiers. Each contact in the set of contacts associated with the user may include a company name. Determining the subset of the set of contacts associated with the user may include identifying a set of unique company names based on the company names of the set of contacts. Each contact in the set of contacts associated with the user may further include a job title. The data associated with the product may include a ranked list of job titles. The subset of the set of contacts associated with the user may include at least one of a first set of contacts, a second set of contacts, and a third set of contacts. The first set of contacts may include contacts that have a job title specified in the ranked list of job titles and that have a company name that is included in the set of unique company names. The second set of contacts may include contacts that have a company name that is included in the set of unique company names but do not have a job title specified in the ranked list of job titles. The third set of contacts may include contacts that have a job title specified in the ranked list of job titles but do not have a company name that is included in the set of unique company names.

In some embodiments, the product may be a first product, the request may be further for contacts to use to initiate communications for a second product, and the subset of the set of contacts associated with the user may be a first subset. The instructions may further cause the at least one processing unit to determine a second subset of the set of contacts associated with the user based on data associated with the second product. The instructions may also cause the at least one processing unit to provide the client device the second subset of the set of contacts associated with the user as candidates for initiating communications for the second product.

The client device may be a first client device, the request may be a first request for contacts to use to initiate communications for a first product, and the set of contact may be a first set of contacts. The instructions may further cause the at least one processing unit to receive from a second client device a second request for contacts to use to initiate communications for a second product. The instructions may also cause the at least one processing unit to identify a second set of contacts associated with a second user of the second client device. The instructions may further cause the at least one processing unit to determine a subset of the second set of contacts associated with the second user based on data associated with the second product. The instructions may also cause the at least one processing unit to provide the second client device the subset of the second set of contacts associated with the second user as candidates for initiating communications for the second product.

The following detailed description and accompanying drawings provide a better understanding of the nature and advantages of the present invention.

BRIEF DESCRIPTION OF THE DRAWINGS

FIG. 2 illustrates a graphical user interface (GUI) for providing contacts associated with a user to use to initiate communications for a product according to some embodiments.

FIG. 3 illustrates a GUI for providing products and contacts associated with a user to use to initiate communications for the products according to some embodiments.

FIG. 4 illustrates the GUI illustrated in FIG. 3 upon a selection of another product according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a system that searches contact data associated with a user in order to provide the user with contacts for initiating communications for a product. In some embodiments, the system searches the contact data associated with the user based on information associated with companies, information associated with products, and/or information associated with past sales transactions. In some embodiments, the system may provide the user a graphical user interface (GUI) for presenting products and contacts for initiating communications for the products.

Figure 1:
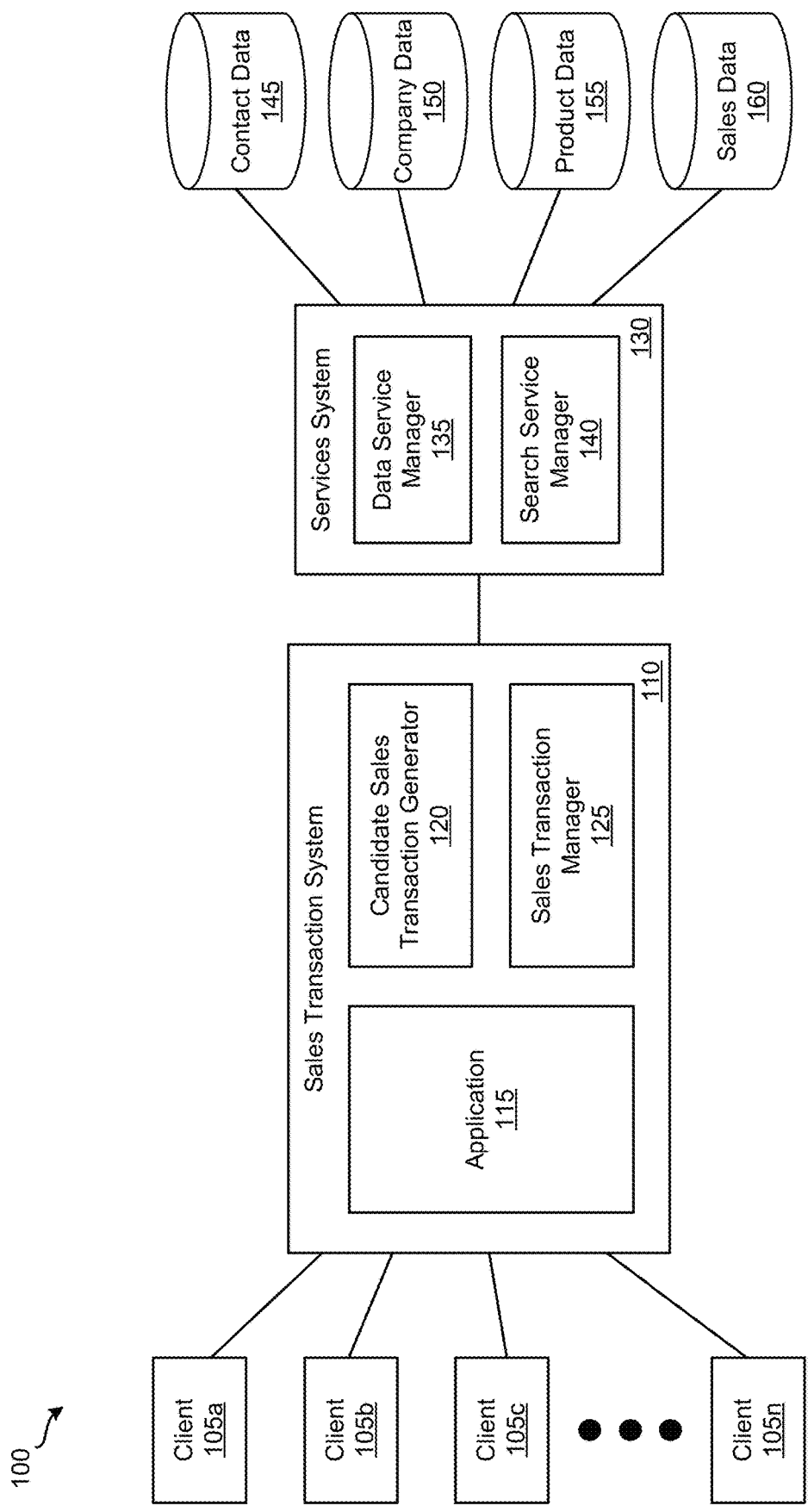
FIG. 1 illustrates a system according to some embodiments.

FIG. 1 illustrates a system 100 according to some embodiments. As shown, system 100 includes client devices 105a-n, sales transaction system 110, services system 130, and storages 145-160. Client devices 105a-n are configured to access and communicate with sales transaction system 110 (e.g., via a network). For example, a user may use a client device 105 to send sales transaction system 110 contact data associated with the user, requests for contacts for products, requests to initiate sales transactions, etc.

Contact data storage 145 is configured to store contact information associated with different users. In some embodiments, contact information for a particular contact may include a name (e.g., first name, middle name, last name, etc.), employment information (e.g., a job title/position, a company name, etc.), telephone numbers, emails, a user identifier of a user with which the particular contact is associated, etc. Different users may have different contact information. As such, contact information associated with one user may be different than contact information associated with another user.

Company data storage 150 is configured to store information associated with different companies. In some embodiments, information associated with a particular company includes a company name, a size of the particular company (e.g., a number of employees employed at the particular company), an industry identifier that represents an industry with which associated the particular company is associated (e.g., a Standard Industrial Classification (SIC) code, a North American Industry Classification System (NAICS) code, an International Standard Industrial Classification of All Economic Activities (ISIC) code, etc.), an amount of revenue associated with the particular company (e.g., an amount of annual revenue generated by the particular company during the most recent year, an average amount of annual revenue generated by the particular company during the most recent number of years, etc.), etc.

Product data storage 155 is configured to store information associated with different products. In some embodiments, information associated with a particular product may include a name of the particular product, a category with which the product is associated, a ranked list of job titles (e.g. chief executive officer, chief financial officer, chief technical officer, president, vice president, general counsel, etc.), a ranked list of industry identifiers, a ranked list of company names, a company size range (e.g., a minimum company size value and a maximum company size value), an annual revenue range (e.g., a minimum annual revenue value and a maximum annual revenue value), a referral percentage, an average price of sales transactions of the particular product, etc.

Sales data storage 160 is configured to store information associated with different sales transactions. In some embodiments, information associated with a particular sales transactions may include information associated with a sales representative handling the particular sales transaction (e.g., the sales representative that initiated the particular sales transaction), information of a contact used for initiating the particular sales transaction (e.g., a job title/position of the contact, a name of a company where the contact is employed, etc.), a product associated with the particular sales transaction, an industry identifier associated with the company where the contact is employed, a status of the sales transaction (e.g., completed, incomplete, a number of days in-progress, etc.), a flag for indicating whether to process the particular sales transaction, etc.

Storages 145-160 may be relational databases, non-relational databases (e.g., document-oriented databases, key-value databases, column-oriented databases, etc.), or a combination thereof. In some embodiments, storages 145-160 are implemented in a single physical storage while, in other embodiments, storages 145-160 may be implemented across several physical storages. While FIG. 1 shows storages 145-160 as external to services system 130, one of ordinary skill in the art will appreciated that storages 145, 150, 155, and/or 150 may be included in services system 130 in some embodiments.

As illustrated in FIG. 1, sales transaction system 110 includes application 115, candidate sales transaction generator 120, and sales transaction manager 125. In some embodiments, candidate sales transaction generator 120 and sales transaction manager 125 are services (e.g., web services, representational state transfer (REST) services, microservices, etc.) operating on sales transaction system 110 that may be accessed by application 115. Application 115 serves as an interface through which client devices 105a-n access and communicate with sales transaction system 110. For example, application 115 may receive from a user of client device 105 contact information associated with the user. In response to receiving such contact information, application 115 sends the contact information to be stored in contact data storage 145 via data service manager 135 of services system 130. As mentioned above, different users may have different contact information.

In some embodiments, application 115 can receive different types of requests from a user of client device 105. For instance, application 115 may receive from a user of client device 105 a request for contacts associated with the user to use to initiate communications (e.g., communications for sales transactions) for a product. In response, application 115 sends candidate sales transaction generator 120 the request. Application 115 may receive from candidate sales transaction generator 120 a set of contacts associated with the user to use to initiate communications for the product, which application 115 sends to client device 105 to present to the user.

As another example, application 115 may receive from a user of client device 105 a request for products and contacts associated with the user to use to initiate communications for each product in the set of products. To process such a request, application 115 sends candidate sales transaction generator 120 a request for contacts associated with the user to use to initiate communications for each product in the set of products. Application 115 then receives from candidate sales transaction generator 120 a set of contacts associated with the user for each product in the set of products, which application 115 forwards to client device 105 to present to the user.

In some instances, application 115 can receive from a user of client device 105 a request to initiate a sales transaction for a product along with contact information of a contact. In some embodiments, application 115 generates an email message that includes the email address of the contact in the recipient field of the email message, the email address of the user in the sender field of the email message, and a predefined message in the body of the email message that includes information associated with the product. Application 115 sends the generated email message to client device 105 for the user to review. Once the user of client device 105 reviews the email message and sends application 115 a request to send the email message, application 115 sends it.

In addition to sending the email message, application stores information associated with the initiated sales transaction in sales data storage 160.

Candidate sales transaction generator 120 is configured to determine contacts associated with a user that may be used to initiate communications for a product. For example, when candidate sales transaction generator 120 receives from application 115 a request for contacts associated with a user to use to initiate communications for a product, candidate sales transaction generator 120 request search service manager 140 of services system 130 to identify the contact information of contacts associated with the user stored in contact data storage 145. Next, candidate sales transaction generator 120 requests search service manager 140 of services system 130 to determine unique companies included in the contact information of the identified contacts. Candidate sales transaction generator 120 then requests search service manager 140 to determine a set of companies in the unique companies that have an industry identifier specified in the ranked list of industry identifies associated with the product and that have a size that falls within the company size range associated with the product. Next, candidate sales transaction generator 120 requests search service manager 140 for a first set of contacts associated with the user that have a job title specified in the ranked list of job titles associated with the product and that have a company name that is included in the determined set of companies in the unique companies. In addition, candidate sales transaction generator 120 requests search service manager 140 for a second set of contacts associated with the user that have a company name that is included in the determined set of companies in the unique companies but do not have a job title specified in the ranked list of job titles associated with the product. Candidate sales transaction generator 120 also requests search service manager 140 for a third set of contacts associated with the user that have a job title specified in the ranked list of job titles associated with the product but do not have a company name that is included in the determined set of companies in the unique companies.

Once candidate sales transaction generator 120 receives the first, second, and third sets of contacts described above from search service manager 140, candidate sales transaction generator 120 sorts the first, second, and third sets of contacts. In some embodiments, candidate sales transaction generator 120 sorts these sets of contacts by retrieving the ranked list of job titles associated with the product stored in product data storage 155 via search service manager 140. Candidate sales transaction generator 120 may sort the contacts in the first set of contacts based on the combined rankings of the job titles of the contacts in the ranked list of job titles and the industry identifiers associated with the companies of the contacts in the ranked list of industry identifiers. For example, a contact with a job title ranked first in the ranked list of job titles and an industry identifier associated with a company ranked third in the ranked list of industry identifiers is placed higher than another contact with a job title ranked third in the ranked list of job titles and an industry identifier associated with a company ranked second in the ranked list of industry identifiers. In instances where two contacts have the same combined rankings, candidate sales transaction generator 120 may place the contact with the higher ranked industry identifier in the ranked list of industry identifiers higher than the other contact. In some embodiments, candidate sales transaction generator 120 groups contacts with the same company name together. In some such embodiments, a first contact may have a lower combined ranking than a second contact, but the first contact is placed higher than the second contact because the first contact has the same company name as a third contact, which has a higher combined ranking than the second contact. When contacts with the same company name are grouped together, the contacts are sorted highest to lowest based on their combined rankings of the job titles of the contacts in the ranked list of job titles and the industry identifiers associated with the companies of the contacts in the ranked list of industry identifiers.

Candidate sales transaction generator 120 may sort the contacts in the second set of contacts based on the rankings of the industry identifiers associated with the companies of the contacts in the ranked list of industry identifiers. In some embodiments, candidate sales transaction generator 120 groups contacts with the same company name together. In some such embodiments, a first contact may have a lower ranked industry identifier than a second contact, but the first contact is placed higher than the second contact because the first contact has the same company name as a third contact, which has a higher ranked industry identifier than the second contact. When contacts with the same company name are grouped together, the contacts are sorted highest to lowest based on their rankings of the industry identifiers associated with the companies of the contacts in the ranked list of industry identifiers.

Candidate sales transaction generator 120 may sort the contacts in the third set of contacts based on the rankings of the job titles of the contacts in the ranked list of job titles. In some embodiments, candidate sales transaction generator 120 groups contacts with the same company name together. In some such embodiments, a first contact may have a lower ranked job title than a second contact, but the first contact is placed higher than the second contact because the first contact has the same company name as a third contact, which has a higher ranked job title than the second contact. When contacts with the same company name are grouped together, the contacts are sorted highest to lowest based on their rankings of the job titles of the contacts in the ranked list of job titles.

When candidate sales transaction generator 120 completes the sorting of the first, second, and third sets of contacts, candidate sales transaction generator 120 aggregates the first, second, and third sets of contacts. For example, candidate sales transaction generator 120 places the first set of contacts higher than the second set of contacts and places the second set of contacts higher than the third set of contacts. Candidate sales transaction generator 120 then sends the aggregated first, second, and third sets of contacts to application 115.

FIG. 2 illustrates a GUI 200 for providing contacts associated with a user to use to initiate communications for a product according to some embodiments. In some embodiments, application 115 may provide GUI 200 to a user of client device 105. In this example, GUI 200 is providing ten contacts 205-250 associated with a user to use to initiate communications for a Product A. As shown, each of contacts 205-250 includes a name, a job title, a company name (e.g., a name of a company where the contact is employed), and a selectable user interface (UI) item 255 for requesting to initiate a sales transaction for the product with the corresponding contact.

In addition, GUI 200 shows contacts 205-250 sorted in the same manner described above. Specifically, GUI 200 illustrates that contacts 205-250 are an aggregate of a first set of contacts 260, a second set of contacts 265, and a third set of contacts 270. For this example, the first set of contacts 260 includes contacts associated with the user that have a job title specified in the ranked list of job titles associated with Product A and that have a company name of a company that has an industry identifier specified in the ranked list of industry identifies associated with Product A and has a size that falls within the company size range associated with Product A. In this example, the combined rankings of combined rankings of the job title of contact 205 in the ranked list of job titles and the industry identifier associated with the company of contact 205 in the ranked list of industry identifiers is higher than that of contact 210. As such, contact 205 is placed higher than contact 210.

The second set of contacts 265 includes contacts associated with the user that have a company name of a company that has an industry identifier specified in the ranked list of industry identifies associated with Product A and has a size that falls within the company size range associated with Product A, but do not have a job title specified in the ranked list of job titles associated with Product A. For this example, the ranking of the industry identifier associated with the company of contact 215 in the ranked list of industry identifiers is higher than that of contact 220, which is higher than that of contact 225, and so on and so forth. Thus, contact 215 is placed higher than contact 220, which is placed higher than contact 225, etc.

The third set of contacts 270 includes contacts associated with the user that have a job title specified in the ranked list of job titles associated with Product A but do not have a company name of a company that has an industry identifier specified in the ranked list of industry identifies associated with Product A and has a size that falls within the company size range associated with Product A. In this example, the ranking of the job title of contact 240 in the ranked list of job titles is higher than that of contacts 245 and 250. As such, contact 240 is placed higher than contact 245, which is placed higher than contact 250.

As described above, contacts with the same company name may be grouped together in some embodiments. As illustrated in FIG. 2, contacts 220-230 are grouped together since these contacts have the same company name. For the same reason, contacts 245 and 250 are grouped together. In this example, contacts 225 and/or 230 may have a lower combined ranking than contact 235, but contacts 225 and/or 230 are placed higher than contact 235 because contacts 225 and/or 230 have the same company name as contact 220, which has a higher combined ranking than contact 235.

Returning to FIG. 1, the above sections describe candidate sales transaction manager 120 processing a request received from application 115 for contacts associated with a user to use to initiate communications for a product. Candidate sales transaction manager 120 may also receive a request from application 115 for contacts associated with a user to use to initiate communications for several products. In some embodiments, the request is for contacts associated with a user to use to initiate communications for all the products stored in product data storage 155. To process such a request, candidate sales transaction generator 120 determines a set of contacts associated with the user that may be used to initiate communications for each of the different products in the same manner described above.

Next, candidate sales transaction generator 120 generates a ranked list of the different products sorted from highest referral potential to lowest referral potential. For each product, candidate sales transaction generator 120 requests search service manager 140 to identify the referral percentage associated with the product and calculates an amount of referral potential based on the referral percentage and the set of contacts associated with the user that may be used to initiate communications for the product. In some embodiments, candidate sales transaction generator 120 calculates the amount of referral potential by multiplying the referral percentage by the number of unique companies in the set of contacts associated with the user that may be used to initiate communications for the product. Then, candidate sales transaction generator 120 sends the list of ranked products and the corresponding sets of contacts to application 115.

FIG. 3 illustrates a GUI 300 for providing products and contacts associated with a user to use to initiate communications for the products according to some embodiments. In some embodiments, application 115 may provide GUI 300 to a user of client device 105. As shown, GUI 300 is providing a ranked list of products 305-340 contacts associated with a user to use to initiate communications for a product 305 (Product A), as indicated by a highlighting of product 305. In this example, GUI 300 is showing contacts (i.e., contacts 205-250) that are associated with the same user illustrated in FIG. 2 to use to initiate communications for Product A.

As illustrated in FIG. 3, products 305-340 are sorted from highest referral potential to lowest referral potential. Additionally, each of products 305-340 includes a number of unique companies in the set of contacts associated with the user that may be used to initiate communications for the product (e.g., prospects) and an amount of referral potential calculated in the manner described above. In this example, product 305 has seven prospects since, although there are ten contacts for product 305, there are seven unique companies in contacts 205-250.

Figure 4:
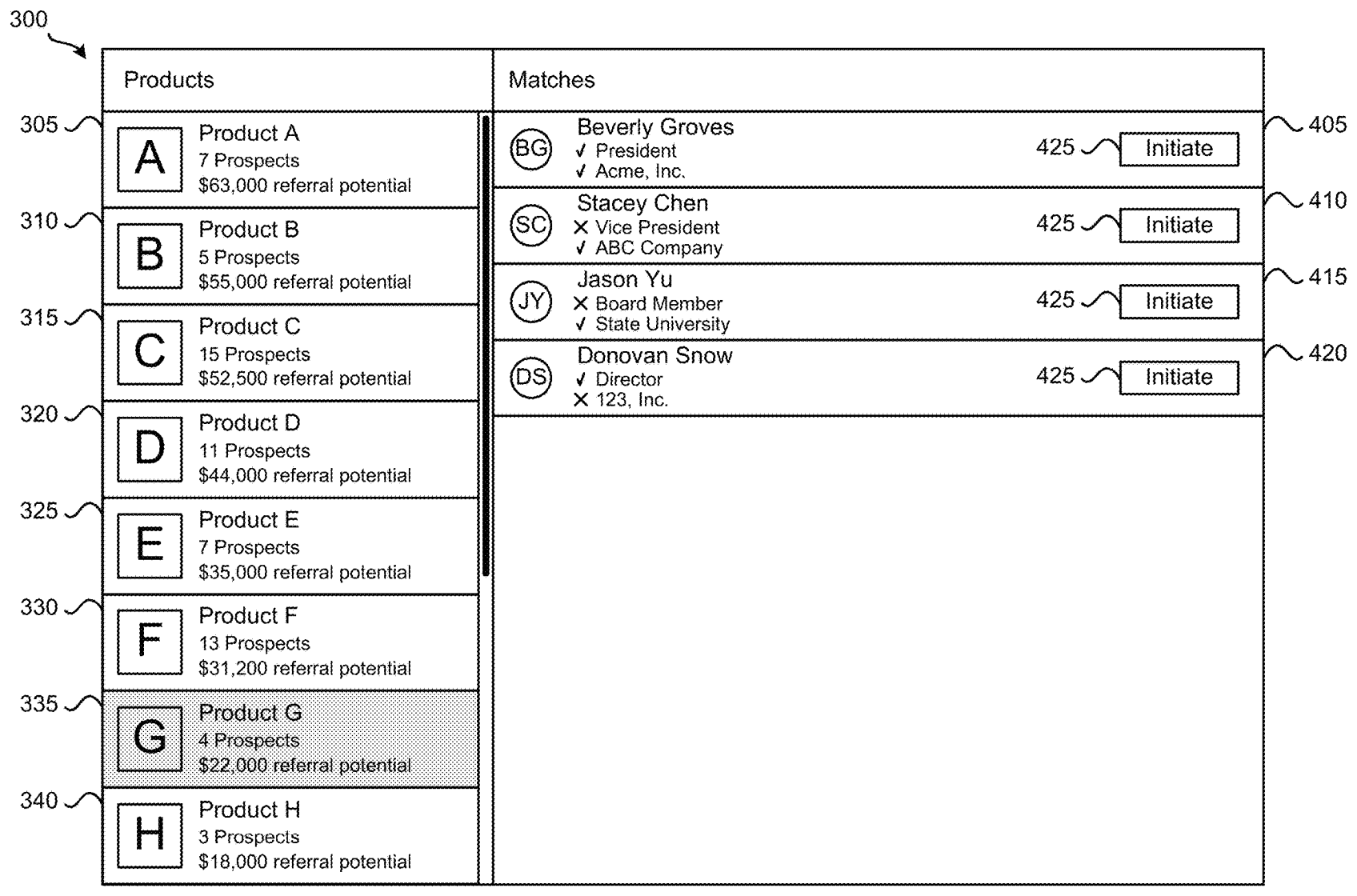

When application 115 provides a user of client device 105 a GUI such as GUI 300, the user may select different product in the list of ranked products 305-340. In response to receiving a selection of a different product, application 115 provides the user of client device 105 the corresponding set of contacts associated with the user to use to initiate communications for the selected product. FIG. 4 illustrates GUI 300 illustrated in FIG. 3 upon a selection of another product according to some embodiments. In particular, FIG. 4 shows GUI 300 after a selection of product 335, as indicated by a highlighting of product 335. As such, GUI 300 is providing contacts 405-420 associated with the same user illustrated in FIGS. 2 and 3 to use to initiate communications for product 335 (Product G).

As illustrated, contacts 405-420 are an aggregate of the three different sets of contacts described above: a first set of contacts (contact 405 in this example) that includes contacts associated with the user that have a job title specified in the ranked list of job titles associated with a product (Product G in this example) and that have a company name of a company that has an industry identifier specified in the ranked list of industry identifies associated with the product and has a size that falls within the company size range associated with the product; a second set of contacts (contacts 410 and 415 in this example) that includes contacts associated with the user that have a company name of a company that has an industry identifier specified in the ranked list of industry identifies associated with the product and has a size that falls within the company size range associated with the product, but do not have a job title specified in the ranked list of job titles associated with the product; and a third set of contacts (contact 420 in this example) that includes contacts associated with the user that have a job title specified in the ranked list of job titles associated with the product but do not have a company name of a company that has an industry identifier specified in the ranked list of industry identifies associated with the product and has a size that falls within the company size range associated with the product. FIG. 4 illustrates an example of providing a corresponding set of contacts associated with a user to use to initiate communications for a product upon receiving a selection of the product. One of ordinary skill in the art will appreciate that different corresponding sets of contacts associated with a user to use to initiate communications for a product may be provided when selections of different products are received.

Returning to FIG. 1, sales transaction manager 125 handles the processing of sales transactions stored in sales data storage 160 that are flagged for processing. In some embodiments, a sales transaction is flagged for processing when the status of the sales transaction is changed to completed (e.g., indicating a successful sale of a product by a sales representation to a company via a contact of the sales representative) or incomplete (e.g., indicating an un successful sale of a product by a sales representation to a company via a contact of the sales representative). Sales transaction manager 125 may process sales transactions at defined intervals (e.g., once an hour, once a day, once a week, once a month, etc.).

When sales transaction manager 125 processes sales transactions, sales transaction manager 125 selects a sales transaction stored in sales data storage 160 that has a flag indicating to process the sales transaction. Next, sales transaction manager 125 requests search service manager 140 to determine the product associated with the sales transaction. As mentioned above, the information associated with a particular product may include a ranked list of job titles and a ranked list of industry identifiers. In some embodiments, the rank value of each job title in the ranked list of job titles associated with a product begins with a default value (e.g., 0, 1, etc.) and the rank value of each industry identifier in the ranked list of industry identifiers associated with the product begins with the default value. In some such embodiments, a higher rank value indicates a higher rank. For example, a job title with a rank value of 20 is ranked higher than a job title with a rank value of 14. Similarly, an industry identifier with a rank value of 15 is ranked higher than an industry identifier with a rank value of 7.

In cases where the status of the sales transaction is completed, sales transaction manager 125 requests data service manager 135 to increase the rank value of the job title of the contact in the ranked list of job titles of the product and increase the rank value of the industry identifier associated with the company of the contact in the ranked list of industry identifiers of the product. If the job title of the contact does not exist in the ranked list of job titles, sales transaction manager 125 request data service manager 135 to add the job title of the contact to the ranked list of job titles with the default rank value. Similarly, if the industry identifier associated with the company of the contact does not exist in the ranked list of industry identifiers, sales transaction manager 125 request data service manager 135 to add the industry identifier associated with the company of the contact to the ranked list of industry identifies with the default rank value. In cases where the status of the sales transaction is incomplete, sales transaction manager 125 requests data service manager 135 to decrease the rank value of the job title of the contact in the ranked list of job titles of the product and decrease the rank value of the industry identifier associated with the company of the contact in the ranked list of industry identifiers of the product. Once sales transaction manager 125 has processed the sales transaction, sales transaction manager 125 requests data service manager 135 to change the flag associated with the sales transaction to indicate that the sales transaction has been processed. By processing sales transactions in this manner, the ranked lists of job titles and industry identifiers associated with products may be adjusted based on the status of sales transactions thereby improving the sorting contacts associated with a user that may be used to initiate communications for a product.

As explained above, information associated with a product may include a category with which the product is associated. In some embodiments, products associated with the same category share the same ranked list of job titles and ranked list of industry identifiers. Thus, when sales transaction manager 125 modifies the ranked list of job titles and ranked list of industry identifiers of a particular product associated with the sales transaction during the processing of the sales transaction, sales transaction manager 125 effectively adjusts the ranked list of job titles and ranked list of industry identifiers of other products associated with the category as the particular product.

As shown in FIG. 1, services system 130 includes data service manager 135 and search service manager 140. In some embodiments, data service manager 135 and search service manager 140 are services (e.g., web services, REST services, etc.) operating on services system 130 that may be accessed by sales transaction system 110. Data service manager 135 may receive from application 115, candidate sales transaction generator 120, and sales transaction manager 125 requests to create data in data storages 145-160, request to modify data stored in data storages 145-160, and requests to delete data in data storages 145-160. Search service manager 140 may receive from application 115, candidate sales transaction generator 120, and sales transaction manager 125 requests for data from data storages 145-160. In response so such requests, search service manager 140 performs the requested search on one or more data storages 145-160 and returns the results to the requestor.

Figure 5:
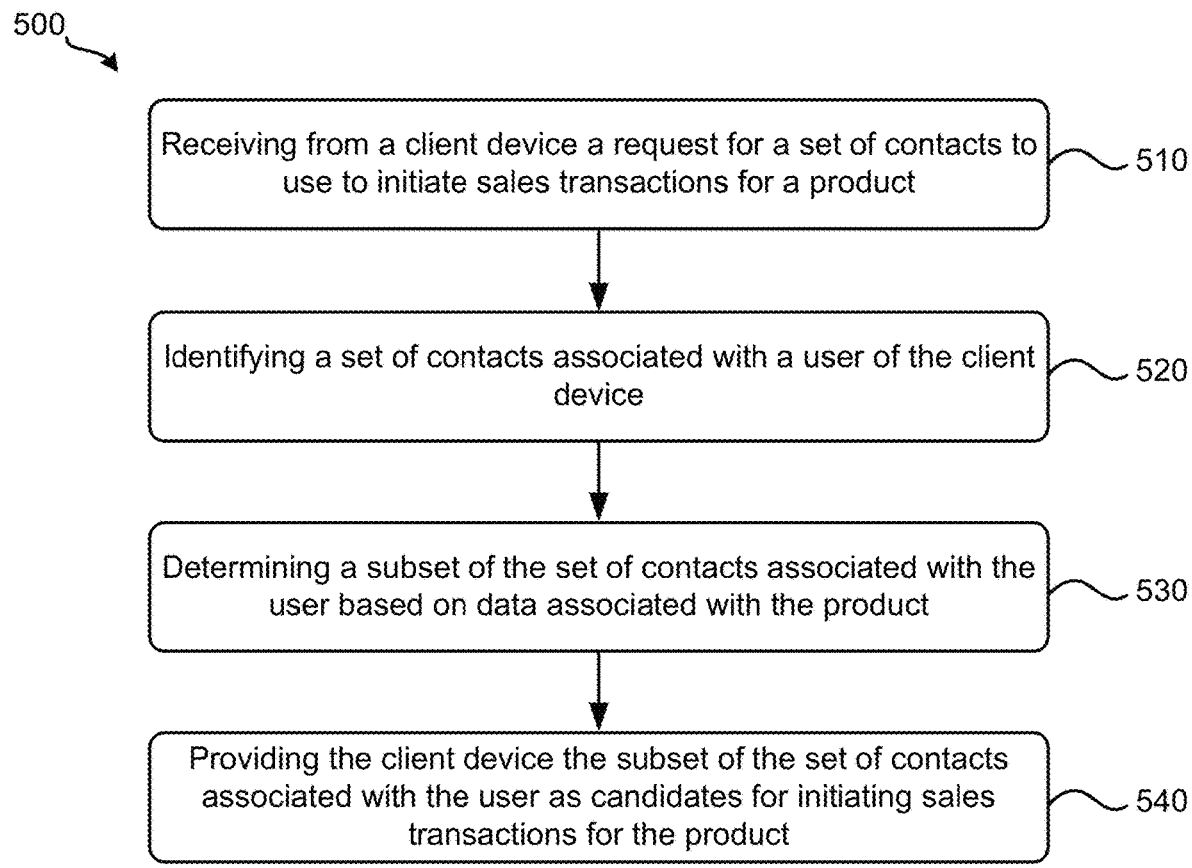
FIG. 5 illustrates a process for providing contacts associated with a user to use to initiate communications for a product according to some embodiments.

FIG. 5 illustrates a process 500 for providing contacts associated with a user to use to initiate communications for a product according to some embodiments. In some embodiments, sales transaction system 110 performs process 500. Process 500 starts by receiving, at 510, from a client device a request for contacts to use to initiate communications for a product. Referring to FIG. 1 as an example, application 115 may receive the request from client device 105.

Next, process 500 identifies, at 520, a set of contacts associated with a user of the client device. Referring to FIG. 1 as an example, contact data storage 145 may store contact information associated with different users and different users may have different contact information, as described above. As such, candidate sales transaction generator 120 may request search service manager 140 to identify contacts stored in contact data storage 145 associated to the user of the client device by identifying contacts that include a user identifier of the user.

Process 500 then determines, at 530, a subset of the set of contacts associated with the user based on data associated with the product. Referring to FIG. 1 as an example, candidate sales transaction generator 120 requests search service manager 140 to determine unique companies included in the contact information of the set of contacts. Candidate sales transaction generator 120 then requests search service manager 140 to determine a set of companies in the unique companies that have an industry identifier specified in the ranked list of industry identifies associated with the product and that have a size that falls within the company size range associated with the product. Next, candidate sales transaction generator 120 requests search service manager 140 for a first set of contacts associated with the user that have a job title specified in the ranked list of job titles associated with the product and that have a company name that is included in the determined set of companies in the unique companies, a second set of contacts associated with the user that have a company name that is included in the determined set of companies in the unique companies but do not have a job title specified in the ranked list of job titles associated with the product; and a third set of contacts associated with the user that have a job title specified in the ranked list of job titles associated with the product but do not have a company name that is included in the determined set of companies in the unique companies. In some embodiments, process 500 sorts the first, second, and third sets of contacts in the manner described above.

Finally, process 500 provides, at 540, the client device the subset of the set of contacts associated with the user as candidates for initiating sales transactions for the product. Referring to FIGS. 2 and 3 as an example, application 115 may provide client device 105 the subset of the set of contacts associated with the user as candidates for initiating sales transactions for the product through a GUI such as GUI 200 or GUI 300.

The examples and embodiments described above illustrate sorting contacts based on a ranked list of job titles and a ranked list of industry identifiers associated with a product. One of ordinary skill in the art will realize that contacts may be sorts using additional and/or different criteria. For example, contacts may be sorted using, alternatively or additionally, a ranked list of company names associated with a product. In addition, several of the examples and embodiments described above illustrate providing a user contacts in response to a request from the user. In some embodiments, sales transaction system 110 may determine contacts associated with a user for one or more products and send (e.g., via email) the determined contacts to the client device 105 of the user at defined intervals (e.g., once a day, once a week, once a month, etc.). That is, sales transaction system 110 determines the contacts associated with the user for one or more products and pushes the information to the client device 105 of the user in an automated manner (e.g., without intervention by the user).

Figure 6:
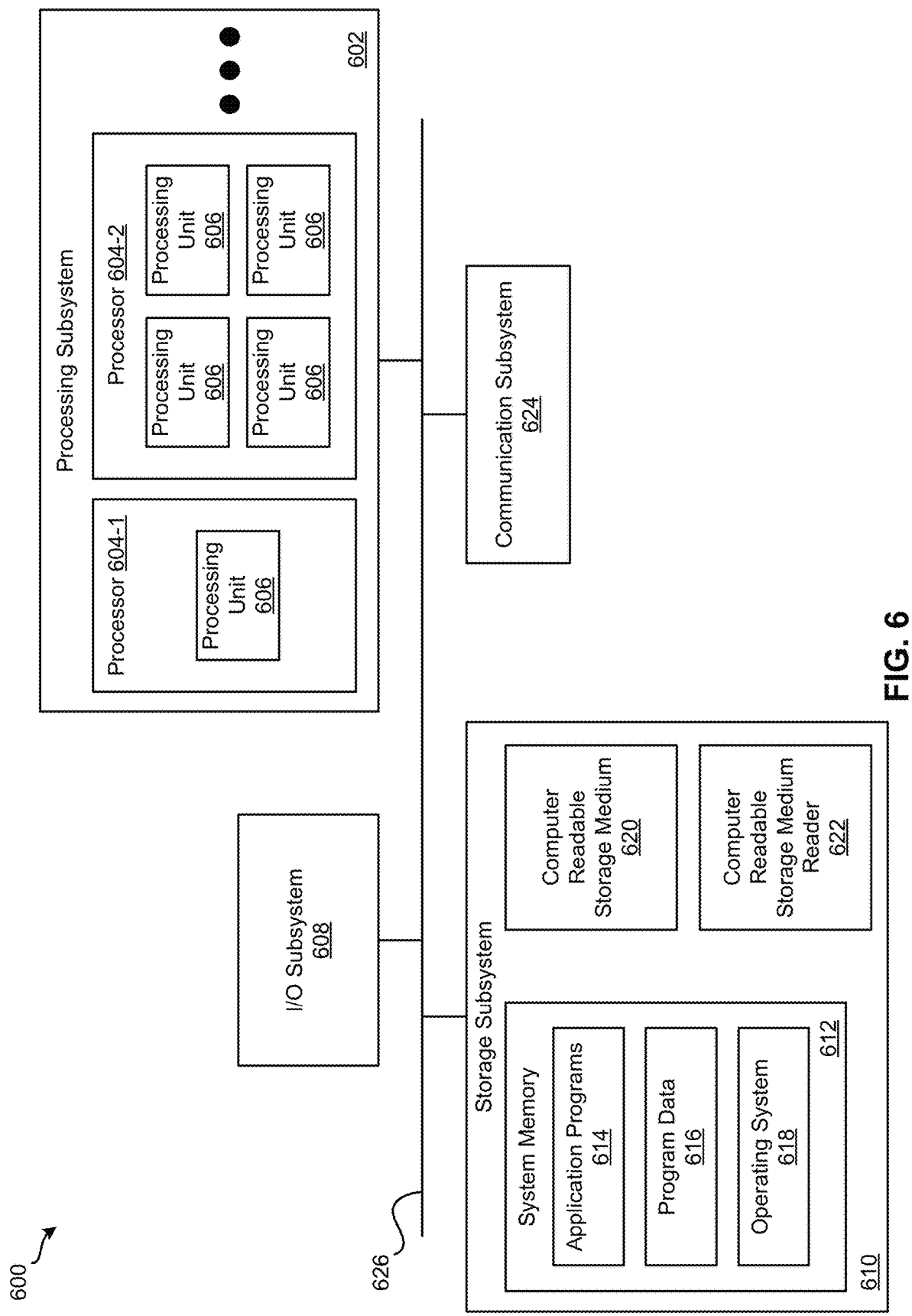
FIG. 6 illustrates an exemplary computer system for implementing various embodiments described above.

FIG. 6 illustrates an exemplary computer system 600 for implementing various embodiments described above. For example, computer system 600 may be used to implement client devices 105a-n, sales transaction system 110, and services system 130. Computer system 600 may be a desktop computer, a laptop, a server computer, or any other type of computer system or combination thereof. Some or all elements of application 115, candidate sales transaction generator 120, sales transaction manager 125, data service manager 135, and search service manager 140, or combinations thereof can be included or implemented in computer system 600. In addition, computer system 600 can implement many of the operations, methods, and/or processes described above (e.g., process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 500, etc.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., application 115), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., application 115, candidate sales transaction generator 120, sales transaction manager 125, data service manager 135, and search service manager 140) and/or processes (e.g., process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
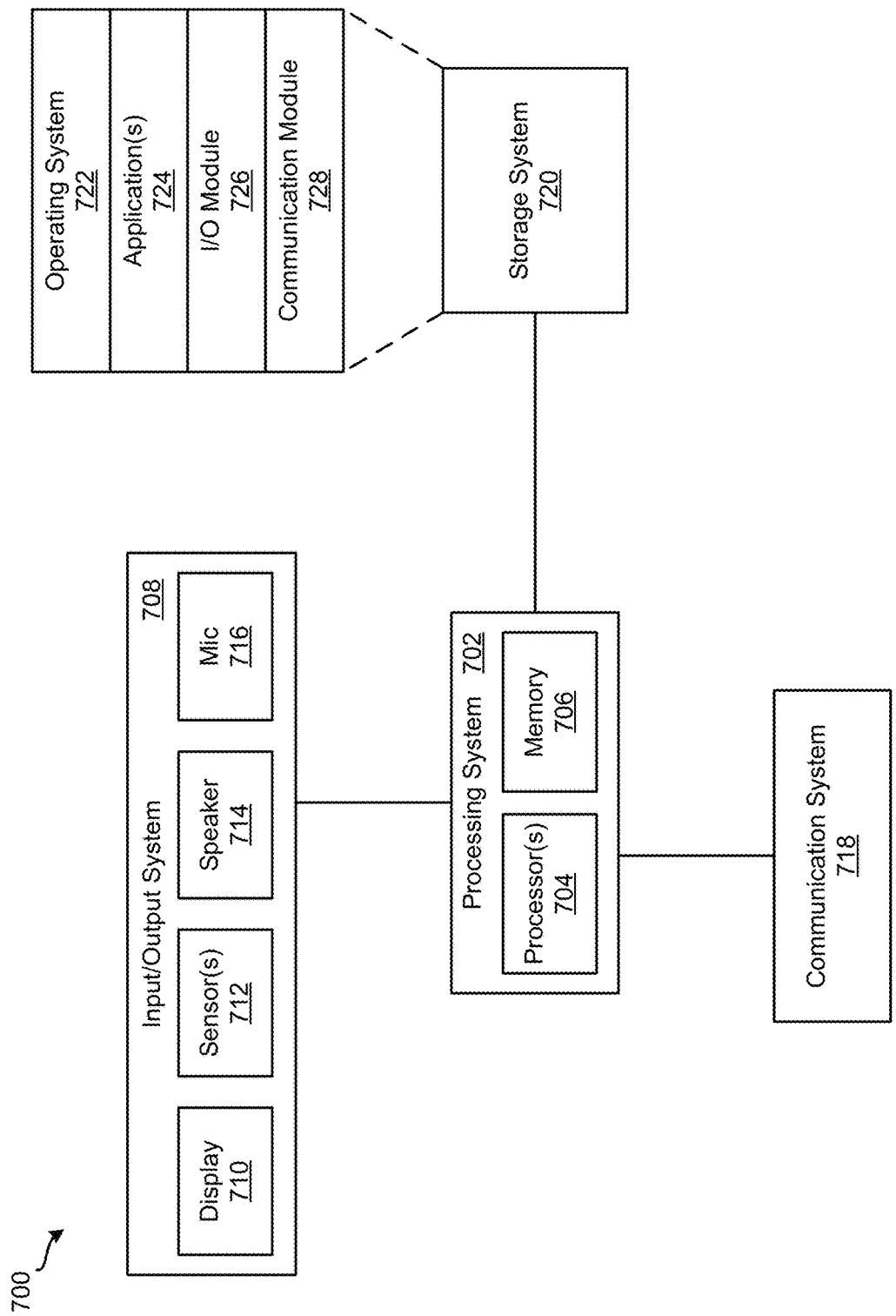
FIG. 7 illustrates an exemplary computing device for implementing various embodiments described above.

FIG. 7 illustrates an exemplary computing device 700 for implementing various embodiments described above. For example, computing device 700 may be used to implement client devices 105*a-n*. Computing device 700 may be a cellphone, a smartphone, a wearable device, an activity tracker or manager, a tablet, a personal digital assistant (PDA), a media player, or any other type of mobile computing device or combination thereof. As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
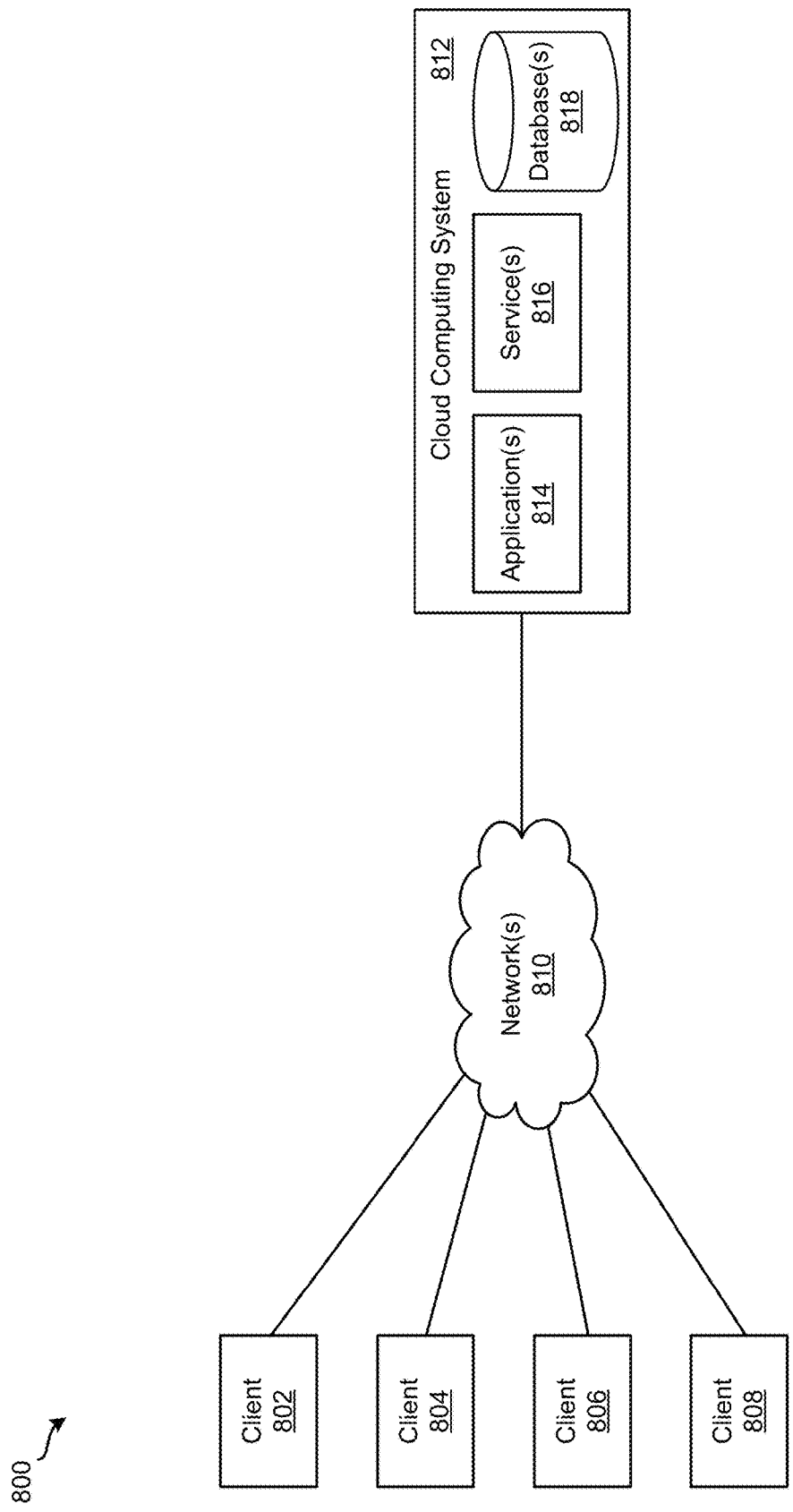
FIG. 8 illustrates an exemplary system for implementing various embodiments described above.

FIG. 8 illustrates an exemplary system 800 for implementing various embodiments described above. For example, cloud computing system 812 of system 800 may be used to implement sales transaction system 110 and services system 130 and client devices 802-808 may be used to implement client devices 105a-n. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 800 is referred to as a "cloud service." Typically, servers and systems that make up cloud computing system 800 are different from the on-premises servers and systems of a customer. For example, cloud computing system 800 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, data storages 145-160 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

receiving from a client device a request for a first set of contacts to use to initiate communications for a first product and a second set of contacts to use to initiate communications for a second product;

in response to receiving the request, identifying contacts associated with a user of the client device by accessing a storage configured to store contacts, wherein each contact stored in the storage comprises a user identifier for identifying a particular user, and identifying contacts in the storage that include a user identifier of the user of the client device;

determining, as the first set of contacts for the first product, a first subset of the contacts associated with the user based on data associated with the first product;

determining, as the second set of contacts for the second product, a second subset of the contacts associated with the user based on data associated with the second product;

sending the client device the first set of contacts for the first product and the second set of contacts for the second product;

providing the client device a graphical user interface (GUI) comprising a first selectable user interface (UI) item that represents the first product and a second selectable UI item that represents the second product, wherein the first selectable UI item, when selected, causes the client device to present, in the GUI, a first set of UI elements representing only the first set of contacts associated with the user as candidates for initiating communications for the first product, wherein each UI element in the first set of UI elements comprises a particular selectable UI item that, when selected, sends a request to initiate a sales transaction for the first product with the corresponding contact represented by the UI element and contact information associated with the corresponding contact, wherein the second selectable UI item, when selected, causes the client device to present, in the GUI, a second set of UI elements representing only the second set of contacts associated with the user as candidates for initiating communications for the second product;

receiving a selection of the particular UI item of an UI element in the first set of UI elements;

in response to receiving the selection, generating a message comprising the contact information associated with the corresponding contact associated with the UI element, contact information associated with the user, and information associated with the first product; and sending the message to the client device.

2. The non-transitory machine-readable medium of claim 1, wherein the data associated with the first product comprises a first ranked list of job titles and a first ranked list of industry identifiers, wherein the data associated with the second product comprises a second ranked list of job titles and a second ranked list of industry identifiers, wherein the program further comprises sets of instructions for:

sorting the first subset of the contacts associated with the user based on the first ranked list of job titles and the first ranked list of industry identifiers; and sorting the second subset of the contacts associated with the user based on the second ranked list of job titles and the second ranked list of industry identifiers.

3. The non-transitory machine-readable medium of claim 1, wherein each contact in the set of contacts associated with the user includes a company name, wherein the program further comprises a set of instructions for identifying a set of unique company names based on the company names of the set of contacts.

4. The non-transitory machine-readable medium of claim 3, wherein each contact in the contacts associated with the user further includes a job title, wherein the data associated with the first product comprises a ranked list of job titles, wherein the first subset of the contacts associated with the user comprises at least one of a first set of contacts, a second set of contacts, and a third set of contacts, wherein the first set of contacts comprises contacts that have a job title specified in the ranked list of job titles and that have a company name that is included in the set of unique company names, wherein the second set of contacts comprises contacts that have a company name that is included in the set of unique company names but do not have a job title specified in the ranked list of job titles, wherein the third set of contacts comprises contacts that have a job title specified in the ranked list of job titles but do not have a company name that is included in the set of unique company names.

5. The non-transitory machine-readable medium of claim 1, wherein each of the contacts associated with the user includes a company name, wherein data associated with the first product comprises a company size range, wherein determining the first subset of the contacts associated with the user based on data associated with the first product comprises including contacts associated with the user having a company name of a company having a size that falls within the company size range.

6. The non-transitory machine-readable medium of claim 1, wherein the client device is a first client device, wherein the request is a first request, wherein the user is a first user, wherein the GUI is a first GUI, wherein the program further comprises sets of instructions for:

receiving from a second client device a second request for a third set of contacts to use to initiate communications for a third product and a fourth set of contacts to use to initiate communications for a fourth product;

in response to receiving the second request, identifying contacts associated with a second user of the second client device;

determining, as the third set of contacts for the third product, a third subset of the contacts associated with the second user based on data associated with the third product;

determining, as the second set of contacts for the second product, a second subset of the contacts associated with the user based on data associated with the second product; and providing the second client device the third set of contacts for the third product, the fourth set of contacts for the fourth product, and a second GUI comprising a third selectable UI item that represents the third product and a fourth selectable UI item that represents the fourth product, wherein the third selectable UI item, when selected, causes the second client device to present, in the second GUI, only the third set of contacts associated with the second user as candidates for initiating communications for the third product, wherein the fourth selectable UI item, when selected, causes the second client device to present, in the second GUI, only the fourth set of contacts associated with the second user as candidates for initiating communications for the fourth product.

7. The non-transitory machine-readable medium of claim 1, wherein the program further comprises sets of instructions for:

receiving from the client device the contacts associated with the user; and storing the contacts associated with the user in the storage.

8. A method, executable by a computing device, comprising:

receiving from a client device a request for a first set of contacts to use to initiate communications for a first product and a second set of contacts to use to initiate communications for a second product;

in response to receiving the request, identifying contacts associated with a user of the client device by accessing a storage configured to store contacts, wherein each contact stored in the storage comprises a user identifier for identifying a particular user, and identifying contacts in the storage that include a user identifier of the user of the client device;

determining, as the first set of contacts for the first product, a first subset of the contacts associated with the user based on data associated with the first product;

determining, as the second set of contacts for the second product, a second subset of the contacts associated with the user based on data associated with the second product;

sending the client device the first set of contacts for the first product and the second set of contacts for the second product;

providing the client device a graphical user interface (GUI) comprising a first selectable user interface (UI) item that represents the first product and a second selectable UI item that represents the second product, wherein the first selectable UI item, when selected, causes the client device to present, in the GUI, a first set of UI elements representing only the first set of contacts associated with the user as candidates for initiating communications for the first product, wherein each UI element in the first set of UI elements comprises a particular selectable UI item that, when selected, sends a request to initiate a sales transaction for the first product with the corresponding contact represented by the UI element and contact information associated with the corresponding contact, wherein the second selectable UI item, when selected, causes the client device to present, in the GUI, a second set of UI elements representing only the second set of contacts associated with the user as candidates for initiating communications for the second product;

receiving a selection of the particular UI item of an UI element in the first set of UI elements;

in response to receiving the selection, generating a message comprising the contact information associated with the corresponding contact associated with the UI element, contact information associated with the user, and information associated with the first product; and sending the message to the client device.

9. The method of claim 8, wherein the data associated with the first product comprises a first ranked list of job titles and a first ranked list of industry identifiers, wherein the data associated with the second product comprises a second ranked list of job titles and a second ranked list of industry identifiers, wherein the method further comprises:

sorting the first subset of the contacts associated with the user based on the first ranked list of job titles and the first ranked list of industry identifiers; and sorting the second subset of the contacts associated with the user based on the second ranked list of job titles and the second ranked list of industry identifiers.

10. The method of claim 8, wherein each contact in the set of contacts associated with the user includes a company name, wherein the method further comprises identifying a set of unique company names based on the company names of the set of contacts.

11. The method of claim 10, wherein each contact in the contacts associated with the user further includes a job title, wherein the data associated with the first product comprises a ranked list of job titles, wherein the first subset of the contacts associated with the user comprises at least one of a first set of contacts, a second set of contacts, and a third set of contacts, wherein the first set of contacts comprises contacts that have a job title specified in the ranked list of job titles and that have a company name that is included in the set of unique company names, wherein the second set of contacts comprises contacts that have a company name that is included in the set of unique company names but do not have a job title specified in the ranked list of job titles, wherein the third set of contacts comprises contacts that have a job title specified in the ranked list of job titles but do not have a company name that is included in the set of unique company names.

12. The method of claim 8, wherein the product is a first product, wherein each of the contacts associated with the user includes a company name, wherein data associated with the first product comprises a company size range, wherein determining the first subset of the contacts associated with the user based on data associated with the first product comprises including contacts associated with the user having a company name of a company having a size that falls within the company size range.

13. The method of claim 8, wherein the client device is a first client device, wherein the request is a first request, wherein the user is a first user, wherein the GUI is a first GUI, wherein the method further comprises:

receiving from a second client device a second request for a third set of contacts to use to initiate communications for a third product and a fourth set of contacts to use to initiate communications for a fourth product;

in response to receiving the second request, identifying contacts associated with a second user of the second client device;

determining, as the third set of contacts for the third product, a third subset of the contacts associated with the second user based on data associated with the third product;

determining, as the second set of contacts for the second product, a second subset of the contacts associated with the user based on data associated with the second product; and providing the second client device the third set of contacts for the third product, the fourth set of contacts for the fourth product, and a second GUI comprising a third selectable UI item that represents the third product and a fourth selectable UI item that represents the fourth product, wherein the third selectable UI item, when selected, causes the second client device to present, in the second GUI, only the third set of contacts associated with the second user as candidates for initiating communications for the third product, wherein the fourth selectable UI item, when selected, causes the second client device to present, in the second GUI, only the fourth set of contacts associated with the second user as candidates for initiating communications for the fourth product.

14. A system comprising:

a set of processing units; and a non-transitory computer-readable medium storing instructions that when executed by at least one processing unit in the set of processing units cause the at least one processing unit to:

receive from a client device a request for a first set of contacts to use to initiate communications for a first product and a second set of contacts to use to initiate communications for a second product;

in response to receiving the request, identify contacts associated with a user of the client device by accessing a storage configured to store contacts, wherein each contact stored in the storage comprises a user identifier for identifying a particular user, and identifying contacts in the storage that include a user identifier of the user of the client device;

determine, as the first set of contacts for the first product, a first subset of the contacts associated with the user based on data associated with the first product;

determine, as the second set of contacts for the second product, a second subset of the contacts associated with the user based on data associated with the second product;

send the client device the first set of contacts for the first product and the second set of contacts for the second product;

provide the client device a graphical user interface (GUI) comprising a first selectable user interface (UI) item that represents the first product and a second selectable UI item that represents the second product, wherein the first selectable UI item, when selected, causes the client device to present, in the GUI, a first set of UI elements representing only the first set of contacts associated with the user as candidates for initiating communications for the first product, wherein each UI element in the first set of UI elements comprises a particular selectable UI item that, when selected, sends a request to initiate a sales transaction for the first product with the corresponding contact represented by the UI element and contact information associated with the corresponding contact, wherein the second selectable UI item, when selected, causes the client device to present, in the GUI, a second set of UI elements representing only the second set of contacts associated with the user as candidates for initiating communications for the second product;

receiving a selection of the particular UI item of an UI element in the first set of UI elements;

in response to receiving the selection, generating a message comprising the contact information associated with the corresponding contact associated with the UI element, contact information associated with the user, and information associated with the first product; and sending the message to the client device.

15. The system of claim 14, wherein the data associated with the first product comprises a first ranked list of job titles and a first ranked list of industry identifiers, wherein the data associated with the second product comprises a second ranked list of job titles and a second ranked list of industry identifiers, wherein the instructions further cause the at least one processing unit to:

sort the first subset of the contacts associated with the user based on the first ranked list of job titles and the first ranked list of industry identifiers; and sorting the second subset of the contacts associated with the user based on the second ranked list of job titles and the second ranked list of industry identifiers.

16. The system of claim 14, wherein each contact in the set of contacts associated with the user includes a company name, wherein the instructions further cause the at least one processing unit to identify a set of unique company names based on the company names of the set of contacts.

17. The system of claim 16, wherein each contact in the contacts associated with the user further includes a job title, wherein the data associated with the first product comprises a ranked list of job titles, wherein the first subset of the contacts associated with the user comprises at least one of a first set of contacts, a second set of contacts, and a third set of contacts, wherein the first set of contacts comprises contacts that have a job title specified in the ranked list of job titles and that have a company name that is included in the set of unique company names, wherein the second set of contacts comprises contacts that have a company name that is included in the set of unique company names but do not have a job title specified in the ranked list of job titles, wherein the third set of contacts comprises contacts that have a job title specified in the ranked list of job titles but do not have a company name that is included in the set of unique company names.

18. The system of claim 14, wherein each of the contacts associated with the user includes a company name, wherein data associated with the first product comprises a company size range, wherein determining the first subset of the contacts associated with the user based on data associated with the first product comprises including contacts associated with the user having a company name of a company having a size that falls within the company size range.

19. The system of claim 14, wherein the client device is a first client device, wherein the request is a first request, wherein the user is a first user, wherein the GUI is a first GUI, wherein the instructions further cause the at least one processing unit to:

receive from a second client device a second request for a third set of contacts to use to initiate communications for a third product and a fourth set of contacts to use to initiate communications for a fourth product;

in response to receiving the second request, identify contacts associated with a second user of the second client device;

determine, as the third set of contacts for the third product, a third subset of the second set of contacts associated with the second user based on data associated with the third product;

determining, as the second set of contacts for the second product, a second subset of the contacts associated with the user based on data associated with the second product; and provide the second client device the third set of contacts for the third product, the fourth set of contacts for the fourth product, and a second GUI comprising a third selectable UI item that represents the third product and a fourth selectable UI item that represents the fourth product, wherein the third selectable UI item, when selected, causes the second client device to present, in the second GUI, only the third set of contacts associated with the second user as candidates for initiating communications for the third product, wherein the fourth selectable UI item, when selected, causes the second client device to present, in the second GUI, only the fourth set of contacts associated with the second user as candidates for initiating communications for the fourth product.

* * * * *